Feb. 16, 1937. C. L. CUMMINS 2,071,062
OIL ENGINE
Filed Sept. 21, 1933  2 Sheets-Sheet 1

Inventor:
Clessie L. Cummins
by Rector, Hibben, Davis & Macauley
Attys.

Feb. 16, 1937.  C. L. CUMMINS  2,071,062
OIL ENGINE
Filed Sept. 21, 1933  2 Sheets—Sheet 2

Inventor:
Clessie L. Cummins
by Rector, Hibben, Davis & Macauley
Attys.

Patented Feb. 16, 1937

2,071,062

UNITED STATES PATENT OFFICE 2,071,062

OIL ENGINE

Clessie L. Cummins, Columbus, Ind., assignor to Oil Engine Development Company, Columbus, Ind., a corporation of Indiana Application September 21, 1933, Serial No. 690,415

17 Claims. (Cl. 123—32)

My invention relates to oil burning engines and is primarily concerned with providing a novel type of combustion chamber that improves the general operation of the engine.

In oil burning engines operating on the so-called Diesel cycle, it is very important that the oil sprays contact as much as possible with the combustion air without striking metal surfaces having a relatively lower temperature. The typical combustion chamber is formed by the cylinder head, wall and the top of the piston and since all of these surfaces are continually cooled by the cooling medium of the engine, their temperatures are much too low to permit a direct striking thereof by the oil sprays. Where such action is permitted, many objectionable operating conditions result, such as a condensation of the fuel vapors with ensuing smoke in the exhaust and a loss of fuel and horse-power, a carbonization of the chamber and valves and sticking of the latter.

The foregoing problem becomes acute in the smaller engines because of the small volume of the combustion chamber and as the oil sprays are necessarily of a somewhat balloon shape, it is quite certain that these sprays will not only strike the piston and cylinder head, but the surrounding cylinder wall as well.

It is therefore the principal object of my invention to devise a combustion chamber which is separate from, but in communication with, the space above the piston, the shape of the chamber being arranged relative to the fuel injector and the communicating openings between the chamber and the space above the piston to provide for a thorough mixing of the air and oil particles substantially in suspension in the chamber.

A further object is to devise a combustion chamber of the character indicated in which the particles of the oil sprays are substantially prevented from striking the cylinder wall by air streams which are directed along the wall into the chamber by the piston during its compression stroke.

A further object is to devise an oil burning engine having a separate combustion chamber in which the air is driven into the chamber through an opening located on the axis of the cylinder and through a pair of openings located at the end of a diameter of the cylinder adjacent the cylinder wall, the central stream of air combining and merging with the other two streams to substantially form relatively stationary, hot masses of air on opposite sides of the cylinder axis into which the fuel sprays are discharged, A further object is to provide a combustion chamber having an elongated shape transversely of the cylinder axis which is formed by a pair of spaced blocks secured to the underside of the cylinder head and extending into the cylinder, the lower side of the chamber being formed by a thin plate which is screwed or otherwise fastened to the bottom surfaces of the blocks, the air films between the blocks and head and plate, respectively, insulating to some degree the plate from the action of the medium which cools the head, whereby the plate is substantially maintained at a temperature above the condensation point of the fuel sprays so that a striking of the plate by the sprays will not prevent the proper combustion of the fuel.

A further object is to devise a combustion chamber having the characteristics above noted in which the fuel sprays are substantially prevented from creeping into the space above the piston, thereby preventing any contamination of the lubricating oil of the engine, and in which a large part of the combustion is effected in the chamber, thereby preventing the temperature of the piston head from becoming excessive.

A further object is to devise a combustion chamber in which the openings connecting the same with the space above the piston are arranged to provide for the proper degree of turbulence in the chamber, that is, sufficient to insure a thorough mixing of the combustion air and the fuel particles, whether the engine is hot or cold, and sufficient to substantially prevent all of the air from being brought into contact with cold surfaces which might otherwise render difficult the starting of the engine.

A further object is to devise a combustion chamber which is disposed with reference to the fuel injector to provide for ample turbulence and the sweeping of sufficient air past the end of the injector to thoroughly consume any fuel vapors which might otherwise cling in this locality in the event of insufficient turbulence.

A further object is to arrange the combustion chamber so as to lessen the amount of heat lost therefrom to the water jackets of the engine, thus rendering available more heat for useful work in the engine.

These and further objects of my invention will be set forth in the following specification, reference being had to the accompanying drawings, and the novel means by which said objects are effectuated will be definitely pointed out in the claims.

Figure 1:
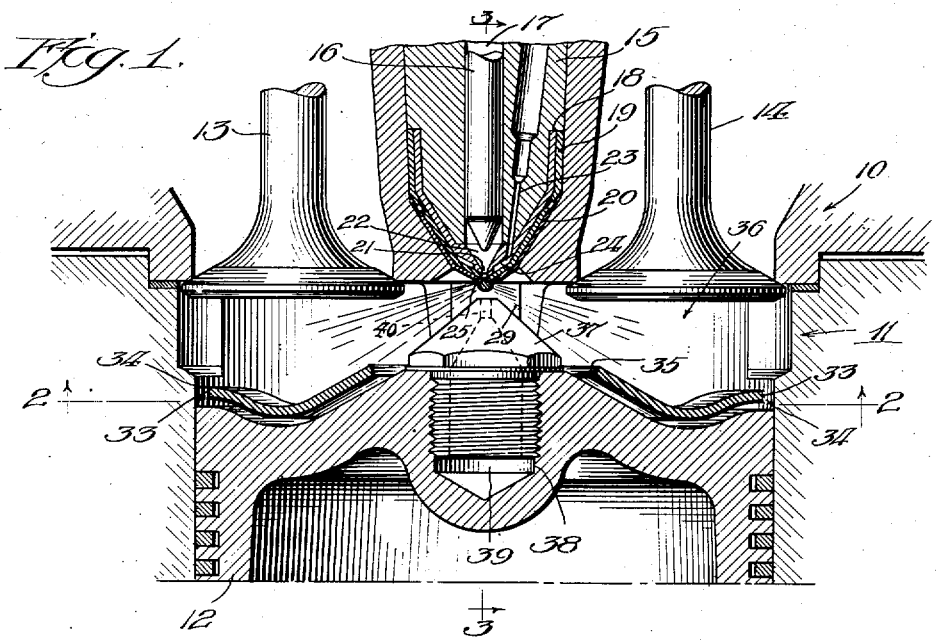
Figure 1 is a sectional view of a portion of the cylinder of an oil burning engine showing the piston substantially at the end of its compression stroke, and the relation thereto of the fuel injector, the inlet and exhaust valves, and my improved combustion chamber.
Figure 2:
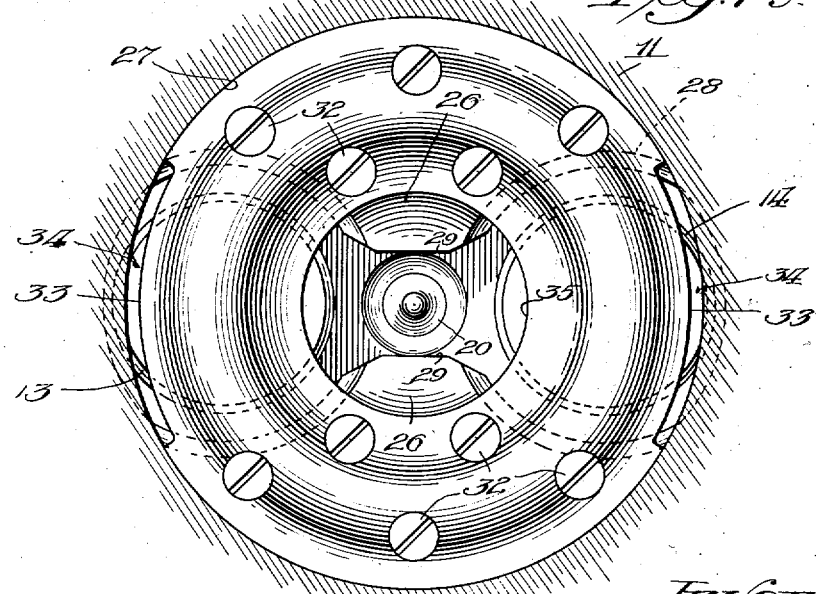
Fig. 2 is a section along the line 2—2 in Fig. 1, looking in the direction of the arrows showing the conformation of the combustion chamber in plan.

Referring to the drawings, the numeral 10 designates part of a cylinder head mounted in the usual manner on the top of a cylinder 11 which is provided with a reciprocating piston 12 of a four-cycle engine of the Cummins-Diesel type, to which, for the purpose of illustration, I have shown the preferred form of embodiment of my invention applied. The usual air inlet valve and exhaust valve 13 and 14, respectively, are mounted for reciprocating movement on opposite sides of the cylinder axis according to the general relation shown in Fig. 1.

The fuel injector employed in the present instance is generally similar to that disclosed in my United States Letters Patent Nos. 1,561,913 and 1,762,653 and may comprise a body member or plug 15, an injecting plunger 16 operable in a central bore 17 in the plug, an inner cup-shaped member 18 fitting over the member 15, a second cup-shaped member 19 fitting over the member 18, and a third or outer cup-shaped insulating member 20 fitting over the member 19. The lower end of the central bore 17 is closed except for a small opening 21 by the lower conical end of the member 18, so that when the plunger 16 is retracted to the position shown in Fig. 1, an atomizing or mixing chamber 22 is formed under the plunger. A charge of fuel oil is fed to the chamber 22 through a conduit 23 in the plug 15 and the passages 24 formed between the conical ends of the members 18 and 19. The lower end of the cup 19 extends through a central opening in the cup 20 and is provided with restricted ports 25 which communicate with a combustion chamber that is more particularly described hereinafter.

Figure 3:
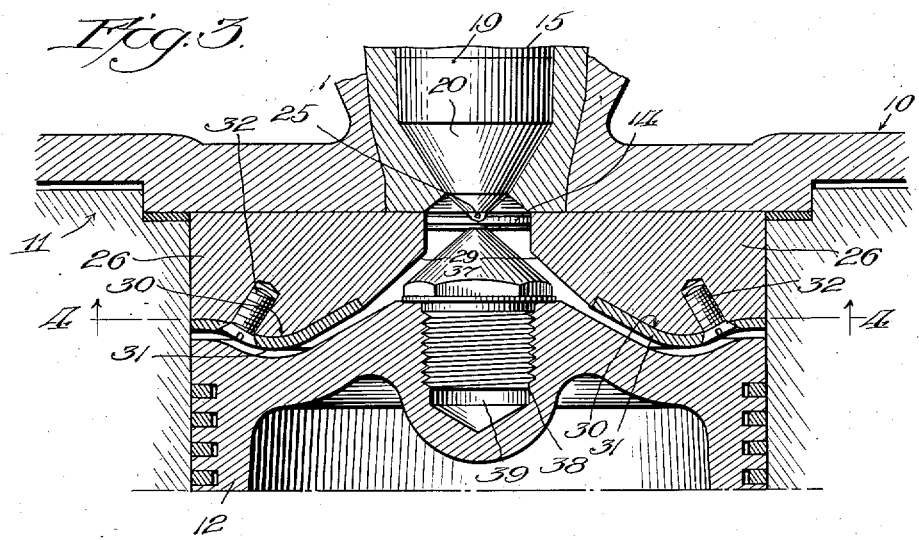
Fig. 3 is a section along the line 3—3 in Fig. 1, looking in the direction of the arrows.
Figure 4:
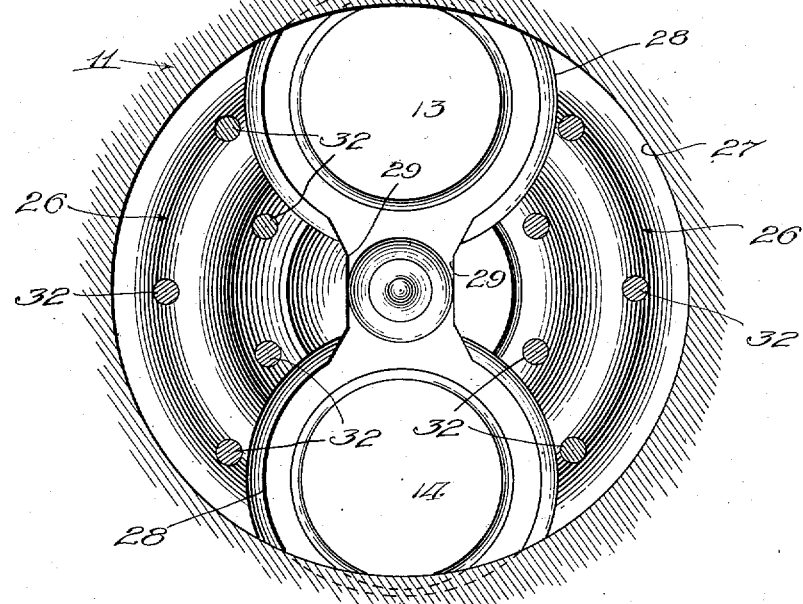
Fig. 4 is a section taken along the line 4—4 in Fig. 3, looking in the direction of the arrows, and showing the relation of the blocks forming a part of the combustion chamber and the valves of the engine, the bottom plate of the chamber being omitted.

A pair of spaced, generally sector-shaped blocks 26 are fastened to the underside of the cylinder head 10 and extend down into the cylinder space above the piston 12. The outer surfaces of these blocks are curved to fit closely the cylinder wall, as indicated by the numeral 27 in Fig. 4, while portions of the facing surfaces of the blocks are curved as at 28 to provide clearance for the movements of the valves 13 and 14. The surfaces 29 which connect the curved surfaces 28 are substantially flat and face each other on opposite sides of the fuel injector. The intermediate portion of each block is bowed slightly along its lower surface to form the substantially pear-shaped section, as indicated by the numeral 30 in Fig. 3, and this latter surface is recessed to provide a seat for a plate 31 which is curved to conform to the underside of the blocks and which is secured thereto by the screws 32. The plate 31 is cut inwardly as at 33 from opposite sides thereof between the blocks and these recesses define with the adjacent cylinder wall parti-annular openings 34 for a purpose presently explained. The plate is also provided with a central opening 35 which is co-axial with the longitudinal axis of the cylinder and which registers with the lower end of the fuel injector. The plate forms with the aforesaid blocks, cylinder head and wall a combustion chamber 36 having the general elongated and bulbous appearance shown in Fig. 4.

A hollow conical plug 37 is threaded in a bore 38 provided in the head of the piston in axial alignment with the fuel injector and this plug and the aforesaid bore define an air chamber 39 which is closed except at the upper end of the plug where it communicates with the combustion chamber through a nozzle opening 40.

In describing the manner in which my improved combustion chamber coacts with the remaining elements above described, it will be assumed that the piston 12 has drawn a charge of air into the cylinder and that the piston is located at some point below that illustrated in Fig. 1, but is moving upwardly on its compression stroke. It will further be understood that, during the suction stroke of the piston, a charge of fuel oil was forced in any approved manner from the passages 24 into the pointed end of the mixing chamber 22 and that while this charge of oil was being delivered into the indicated chamber, the plunger 16 was slowly elevated.

During the compression stroke of the piston, the latter continually forces air through the central opening 35 and through the parti-annular openings 34 into the combustion chamber 36, the gradually increasing compression causing a rapid rise in the temperature of the air. Part of this heated air is driven through the ports 25 and 21 into the mixing chamber 22 where the oil is entrained and thoroughly mixed with the air, while another portion is forced through the openings 34 to form thin walls of hot air which closely hug the adjacent cylinder wall and eventually curl toward the cylinder axis under the cylinder head. The balance of the hot air passes upwardly through the central opening 35, divides and passes in opposite directions toward the cylinder wall to thereafter merge with the streams of air moving upwardly through the openings 34 and eventually establish relatively stationary, hot masses of air in the combustion chamber on opposite sides of the cylinder axis.

Shortly before the piston reaches top center on its compression stroke, and with the air streams moving as above described in the combustion chamber, the plunger 16 is driven downwardly by any suitable means to eject the entire mixture of fuel and air from the mixing chamber 22 through the ports 25 into the chamber 36, the ports being so arranged that they discharge conical sprays in opposite directions into the two portions of the combustion chamber on opposite sides of the fuel injector. These sprays are substantially delivered into the hot air cores created in the two chamber portions, as described above, thus insuring a thorough commingling of the combustion air and the sprays and creating the most favorable condition for proper and efficient combustion. During this action, it will be particularly noted that not only are the sprays prevented from contacting the relatively cool cylinder walls by the sheets of air passing upwardly through the openings 34, but that these streams positively direct the sprays into the hot air cores above noted. Moreover, any fuel particles that may be deposited on the plate 31 will not condense and carbonize, since this plate is maintained at a temperature which is relatively high compared to the temperature of the cylinder wall by reason of the air films between the plate and blocks and between the latter and the cylinder head which insulates to some degree the plate from the cooling action of the cylinder head.

After the piston has passed top center and has started down on its working stroke, the fuel and air vapors which are burning rapidly pass downwardly through the openings or ports 34 and 35 and drive the piston on its power stroke. It will be particularly understood that the openings 34 and 35 are sufficiently large to prevent any throttling action on the expanding flow of the burning charge, since their sole purpose is to direct and control the movement of the air into the combustion chamber during the compression stroke of the piston.

One of the most important advantages of the foregoing combustion chamber construction is its capacity for insuring the prompt starting of a cold engine. Under these conditions, all of the engine parts would be cold, particularly the plate 31, the cylinder head and the cylinder wall, but since all of the air is not swept over all of these cold surfaces during the compression stroke of the piston, there will be a certain amount of air that is heated by the compressing action of the piston and which will eventually reach a comparative state of equilibrium in the two portions of the chamber because of the opposite directions in which the streams of air flow therein. These hot portions of air will be located centrally of the chamber portions, that is, at the cores of the relatively stationary masses of air, and therefore in the most favorable position for prompt ignition of the fuel sprays when the latter are discharged thereinto.

The major portion of the combustion is effected in the combustion chamber and this condition substantially obviates any contamination of the lubricating oil of the engine by reason of a condensation of unburned fuel particles which might otherwise creep downwardly along the cylinder wall. Moreover, the temperature of the top of the piston is maintained at a lower temperature than would otherwise be possible, because the chamber is largely separated from the space above the piston. A further advantage flowing from this separate chamber construction is the decrease in the amount of heat lost to the water jacket of the engine. This result follows because the blocks 26 are more or less insulated from the cylinder head by the air film therebetween, so that considerably more heat is available for useful work in the engine.

In certain types of engines, it may be necessary to employ the plug 37 for reasons more particularly noted in my United States Letters Patent No. 1,762,653. Under these conditions, during the compression stroke of the piston, air will be driven into the chamber 39 and when the piston moves downwardly on its working stroke, the relatively pure air entrained in this chamber will rush out through the nozzle opening 40 and feed fresh air to the zone around the lower end of the injector, thus improving the mixture and distribution of the fuel sprays, providing for better combustion of the fuel vapors and the elimination of carbon deposit on the projecting end of the injector. It is contemplated, however, that, in most cases, the distribution and area of the openings in the plate 31 would be sufficient to insure an adequate turbulence around the fuel injector.

I claim:

1. In an oil burning engine, the combination of a cylinder and a piston operable therein, a combustion chamber communicating with the cylinder space on the compression side of the piston through an opening remote from the cylinder wall and through a second opening adjacent the cylinder wall, and a fuel injector for spraying a charge of fuel into the chamber and located adjacent the remote opening, the piston driving the air through the second opening during the full compression stroke to form an air stream that substantially shields the walls of the chamber contacted thereby from the fuel spray and also through the remote opening towards the injector whereby the fuel is substantially prevented from striking the walls of the chamber.

2. In an oil burning engine, the combination of a cylinder and a piston operable therein, a combustion chamber extending into the cylinder and communicating with the cylinder space on the compression side of the piston through an opening centrally located with respect to the cylinder and through a second opening adjacent the cylinder wall, and a fuel injector for spraying a charge of fuel into the chamber and located opposite the first opening, the piston driving the air through the second opening during its compression stroke to form an air stream that substantially shields the top and side of the chamber contacted thereby from the fuel spray and also through the central opening toward the injector.

3. In an oil burning engine, the combination of a cylinder and a piston operable therein, a partition forming a combustion chamber in the head end of the cylinder, and a fuel injector for spraying a charge of fuel into the chamber toward the cylinder wall, said partition having an opening remote from the cylinder wall and other openings adjacent the cylinder wall whereby the air driven through said other openings by the piston substantially prevents the fuel sprays striking the cylinder wall and combines with the air driven through the first-named opening to substantially form hot masses of air into which the sprays are discharged.

4. In an oil burning engine, the combination of a cylinder and a piston operable therein, a combustion chamber separate from and communicating with the cylinder space on the compression side of the piston through an opening and through a pair of openings adjacent the cylinder wall on opposite sides of the first opening, and a fuel injector for spraying a charge of fuel into the chamber toward the pair of openings, the piston driving the air through the pair of openings during its compression stroke to form air streams that substantially shield the sides and top of the chamber contacted thereby from the fuel sprays and combine with the air driven through the first-named opening to substantially form hot masses of air on opposite sides of the injector into which the sprays are discharged.

5. In an oil burning engine, the combination of a cylinder and a piston operable therein, a combustion chamber elongated transversely of the cylinder and separate from but communicating with the cylinder space on the compression side of the piston through an opening centrally located with respect to the piston and through a pair of parti-annular openings located adjacent the cylinder wall at opposite ends of a cylinder diameter, and a fuel injector for spraying a charge of fuel into the chamber in opposite directions toward the pair of openings, the piston driving the air through the pair of openings during its compression stroke to form air streams that substantially shield the sides and top of the chamber contacted thereby from the fuel sprays and combine with the air driven through the first-named opening to substantially form hot masses of air on opposite sides of the injector into which the sprays are discharged.

6. In an oil burning engine, the combination of a cylinder having an inlet valve and an exhaust valve mounted in the head thereof on opposite sides of the cylinder axis, a piston operable in the cylinder, a pair of generally sector-shaped, spaced blocks on the cylinder head extending into the cylinder space on the compression side of the piston and located along a diameter normal to the diameter through the valves, a plate on the piston side of the blocks for defining a combustion chamber therewith and having an opening centrally located with respect to the piston and cut inwardly from opposite sides thereof between the blocks to define a pair of openings with the cylinder wall, all of the openings connecting the chamber with the cylinder space on the compression side of the piston, and a fuel injector for delivering fuel outwardly in conical sprays between the blocks, the piston driving the air through the pair of openings during its compression stroke to form air streams that substantially shield the sides and top of the chamber contacted thereby from the fuel sprays and combine with the air driven through the first-named opening to substantially form hot masses of air on opposite sides of the injector into which the sprays are discharged, the heat of the plate during the operation of the engine being sufficient to promote the vaporization and combustion of any fuel particles that may contact the same.

7. In an oil burning engine, the combination of a cylinder and a piston operable therein, a combustion chamber extending into and separated from the space in the head end of the cylinder by a wall having an opening remote from the cylinder wall and a pair of openings adjacent the cylinder wall on opposite sides of the first opening, all of the openings connecting the chamber with the cylinder space on the compression side of the piston, and a fuel injector for spraying a charge of fuel into the chamber in opposite directions towards the pair of openings, the piston driving the air through the pair of openings during its compression stroke to form air streams that substantially shield the sides and top of the chamber contacted thereby from the fuel sprays and combine with the air driven through the first named opening to substantially form hot masses of air on opposite sides of the injector into which the sprays are discharged, the temperature of the chamber wall being sufficiently high during the operation of the engine to promote the vaporization and combustion of any fuel particles that may contact the same.

8. In an oil burning engine, the combination of a cylinder and a piston operable therein, a combustion chamber extending into and separated from the space in the head end of the cylinder by a wall having an opening centrally located with respect to the piston and a pair of openings adjacent the cylinder wall located at opposite ends of a cylinder diameter, all of the openings connecting the chamber with the cylinder space on the compression side of the piston, and a fuel injector for delivering substantially conical fuel sprays into the chamber outwardly and downwardly towards the pair of openings and the chamber wall, the piston driving the air through the pair of openings during its compression stroke to form air streams that substantially shield the sides and top of the chamber contacted thereby from the fuel sprays and combine with the air driven through the central opening to substantially form hot masses of air on opposite sides of the injector into which the sprays are discharged, the temperature of the chamber wall being sufficiently high during the operation of the engine to promote the vaporization and combustion of any fuel particles that may contact the same.

9. In an oil burning engine, the combination of a cylinder and a piston operable therein, a pair of spaced blocks on the cylinder head extending into the cylinder space on the compression side of the piston, a plate on the piston side of the blocks for defining a combustion chamber therewith and having an opening centrally located with respect to the piston and cut inwardly from opposite sides thereof between the blocks to define a pair of openings with the cylinder wall, all of the openings connecting the chamber with the cylinder space, and a fuel injector for delivering fuel outwardly in substantially conical sprays between the blocks, the piston driving the air through the pair of openings during its compression stroke to form air streams that substantially shield the sides and top of the chamber contacted thereby from the fuel sprays and combine with the air driven through the central opening to substantially form hot masses of air on opposite sides of the injector into which the sprays are discharged, the temperature of the plate being sufficiently high during the operation of the engine to promote the vaporization and combustion of any fuel particles that may contact the same.

10. In an oil burning engine of the injector type, the combination of a cylinder having a head, a pair of spaced blocks fastened to the inside of the head and fitting within the cylinder, and a plate fastened to the opposite sides of the blocks to form a combustion chamber therewith into which the fuel is injected during the operation of the engine, the plate having openings for connecting the chamber with the cylinder space on the compression side of the piston and the plate being maintained sufficiently hot to promote the vaporization and combustion of any fuel particles that may contact the same.

11. In an oil burning engine, the combination of a cylinder having a combustion chamber and a piston working space, a wall separating the chamber and space and including an opening remote from the cylinder wall and a second opening adjacent the cylinder wall, a piston reciprocable in the working space, fuel injecting means located adjacent the remote opening for spraying a charge of fuel into the chamber, the piston driving the air through the second opening during its compression stroke to form an air stream that substantially shields the top and side of the chamber contacted thereby from the fuel spray and also through the remote opening towards the injector.

12. In an oil burning engine, the combination of a cylinder having a combustion chamber and a piston working space, a wall separating the chamber and space and including an opening remote from the cylinder wall and other openings adjacent the cylinder wall, a piston reciprocable in the working space, fuel injecting means for spraying a charge of fuel into the chamber towards the cylinder wall, the piston driving the air through said other openings to substantially prevent the fuel sprays striking the cylinder wall and through said remote opening, the air driven through all of said openings combining to substantially form hot masses of air into which the sprays are discharged.

13. In an oil burning engine, the combination of a cylinder having a combustion chamber and a piston working space, a wall extending transversely of the cylinder separating the chamber and space and including a plurality of openings for connecting the chamber with the working space, fuel injecting means for spraying a charge of fuel into the chamber and having its delivery end exposed opposite one of the openings, and a piston operable in the working space, the piston driving the air through all of the openings during its compression stroke to provide turbulence in the chamber, a mixing of the air and fuel particles and a flow of the air around and into contact with said delivery end.

14. In an oil burning engine, the combination of a cylinder having a combustion chamber and a piston working space, a wall separating the chamber and space and including a plurality of openings for connecting the chamber with the working space, fuel injecting means for spraying a charge of fuel into the chamber and having its delivery end exposed opposite one of the openings, a piston operable in the working space, an auxiliary air chamber on the piston having an opening adapted to register with said last named wall opening, the piston driving the air through all of the wall openings during its compression stroke to provide turbulence in the chamber, a mixing of the air and fuel particles therein, a flow of the air around and into contact with said delivery end and forcing substantially fresh air into the auxiliary chamber, the air compressed in the auxiliary chamber being discharged against said delivery end during the power strokes of the piston.

15. In an oil burning engine of the injector type, the combination of a cylinder, a transverse partition extending completely across the cylinder to form therein a combustion chamber into which the fuel is injected during the operation of the engine and a cylinder space on the compression side of the piston, the partition having openings for connecting the chamber and space and being maintained sufficiently hot to promote the vaporization and combustion of any fuel particles that may contact the same.

16. In an oil burning engine, the combination of a cylinder having a combustion chamber and a piston working space, a wall within the cylinder separating the chamber and space and including an opening remote from the cylinder wall and a second opening adjacent the cylinder wall, a piston reciprocable in the working space, fuel injecting means located adjacent the remote opening for spraying a charge of fuel into the chamber, the piston driving the air through the second opening during its compression stroke to form an air stream that substantially shields the top and side of the chamber contacted thereby from the fuel spray and also through the remote opening toward the injector, the wall being maintained sufficiently hot to promote the vaporization and combustion of any fuel particles that may contact the same.

17. In an oil burning engine, the combination of a cylinder having a combustion chamber and a piston working space, a wall within the cylinder separating the chamber and space and including an opening remote from the cylinder wall and other openings adjacent the cylinder wall, a piston reciprocable in the working space, fuel injecting means for spraying a charge of fuel into the chamber toward the cylinder wall, the piston driving the air through said other openings to substantially prevent the fuel sprays striking the cylinder wall and through said remote opening, the air driven through all of said openings combining to substantially form hot masses of air into which the sprays are discharged, the wall being maintained sufficiently hot to promote the vaporization and combustion of any fuel particles that may contact the same.

CLESSIE L. CUMMINS.

CERTIFICATE OF CORRECTION.

Patent No. 2,071,062.  February 16, 1937.

CLESSIE L. CUMMINS.

It is hereby certified that error appears in the printed specification of the above numbered patent requiring correction as follows: Page 3, second column, lines 18 and 19, claim 1, strike out the words "whereby the fuel is substantially prevented from striking the walls of the chamber"; page 5, first column, line 47, claim 14, for "strokes" read stroke; and that the said Letters Patent should be read with these corrections therein that the same may conform to the record of the case in the Patent Office.

Signed and sealed this 30th day of March, A. D. 1937.

(Seal)

Henry Van Arsdale
Acting Commissioner of Patents.

chamber and space and including an opening remote from the cylinder wall and other openings adjacent the cylinder wall, a piston reciprocable in the working space, fuel injecting means for spraying a charge of fuel into the chamber towards the cylinder wall, the piston driving the air through said other openings to substantially prevent the fuel sprays striking the cylinder wall and through said remote opening, the air driven through all of said openings combining to substantially form hot masses of air into which the sprays are discharged.

13. In an oil burning engine, the combination of a cylinder having a combustion chamber and a piston working space, a wall extending transversely of the cylinder separating the chamber and space and including a plurality of openings for connecting the chamber with the working space, fuel injecting means for spraying a charge of fuel into the chamber and having its delivery end exposed opposite one of the openings, and a piston operable in the working space, the piston driving the air through all of the openings during its compression stroke to provide turbulence in the chamber, a mixing of the air and fuel particles and a flow of the air around and into contact with said delivery end.

14. In an oil burning engine, the combination of a cylinder having a combustion chamber and a piston working space, a wall separating the chamber and space and including a plurality of openings for connecting the chamber with the working space, fuel injecting means for spraying a charge of fuel into the chamber and having its delivery end exposed opposite one of the openings, a piston operable in the working space, an auxiliary air chamber on the piston having an opening adapted to register with said last named wall opening, the piston driving the air through all of the wall openings during its compression stroke to provide turbulence in the chamber, a mixing of the air and fuel particles therein, a flow of the air around and into contact with said delivery end and forcing substantially fresh air into the auxiliary chamber, the air compressed in the auxiliary chamber being discharged against said delivery end during the power strokes of the piston.

15. In an oil burning engine of the injector type, the combination of a cylinder, a transverse partition extending completely across the cylinder to form therein a combustion chamber into which the fuel is injected during the operation of the engine and a cylinder space on the compression side of the piston, the partition having openings for connecting the chamber and space and being maintained sufficiently hot to promote the vaporization and combustion of any fuel particles that may contact the same.

16. In an oil burning engine, the combination of a cylinder having a combustion chamber and a piston working space, a wall within the cylinder separating the chamber and space and including an opening remote from the cylinder wall and a second opening adjacent the cylinder wall, a piston reciprocable in the working space, fuel injecting means located adjacent the remote opening for spraying a charge of fuel into the chamber, the piston driving the air through the second opening during its compression stroke to form an air stream that substantially shields the top and side of the chamber contacted thereby from the fuel spray and also through the remote opening toward the injector, the wall being maintained sufficiently hot to promote the vaporization and combustion of any fuel particles that may contact the same.

17. In an oil burning engine, the combination of a cylinder having a combustion chamber and a piston working space, a wall within the cylinder separating the chamber and space and including an opening remote from the cylinder wall and other openings adjacent the cylinder wall, a piston reciprocable in the working space, fuel injecting means for spraying a charge of fuel into the chamber toward the cylinder wall, the piston driving the air through said other openings to substantially prevent the fuel sprays striking the cylinder wall and through said remote opening, the air driven through all of said openings combining to substantially form hot masses of air into which the sprays are discharged, the wall being maintained sufficiently hot to promote the vaporization and combustion of any fuel particles that may contact the same.

CLESSIE L. CUMMINS.

---

CERTIFICATE OF CORRECTION.

Patent No. 2,071,062.                              February 16, 1937.

CLESSIE L. CUMMINS.

It is hereby certified that error appears in the printed specification of the above numbered patent requiring correction as follows: Page 3, second column, lines 18 and 19, claim 1, strike out the words "whereby the fuel is substantially prevented from striking the walls of the chamber"; page 5, first column, line 47, claim 14, for "strokes" read stroke; and that the said Letters Patent should be read with these corrections therein that the same may conform to the record of the case in the Patent Office.

Signed and sealed this 30th day of March, A. D. 1937.

(Seal)                                                    Henry Van Arsdale
                                                              Acting Commissioner of Patents.

CERTIFICATE OF CORRECTION.

Patent No. 2,071,062. February 16, 1937.

CLESSIE L. CUMMINS.

It is hereby certified that error appears in the printed specification of the above numbered patent requiring correction as follows: Page 3, second column, lines 18 and 19, claim 1, strike out the words "whereby the fuel is substantially prevented from striking the walls of the chamber"; page 5, first column, line 47, claim 14, for "strokes" read stroke; and that the said Letters Patent should be read with these corrections therein that the same may conform to the record of the case in the Patent Office.

Signed and sealed this 30th day of March, A. D. 1937.

(Seal)

Henry Van Arsdale
Acting Commissioner of Patents.